United States Patent
Welschof et al.

(10) Patent No.: US 8,114,224 B2
(45) Date of Patent: Feb. 14, 2012

(54) PROCESS FOR THE PRODUCTION OF AN ARTICULATED STRUCTURAL PART HAVING IMPROVED WEAR RESISTANCE

(75) Inventors: Hans-Heinrich Welschof, Rodenbach (DE); Wolfgang Hildebrandt, Siegburg (DE); Frank Reher, Wenden (DE)

(73) Assignee: GKN Driveline International GmbH, Lohmar (DE)

( * ) Notice: Subject to any disclaimer, the term of this patent is extended or adjusted under 35 U.S.C. 154(b) by 811 days.

(21) Appl. No.: 11/323,066

(22) Filed: Dec. 30, 2005

(65) Prior Publication Data

US 2006/0169374 A1    Aug. 3, 2006

Related U.S. Application Data

(63) Continuation of application No. PCT/EP2004/010294, filed on Sep. 15, 2004.

(51) Int. Cl.
*C23C 8/22* (2006.01)
*C21D 1/42* (2006.01)

(52) U.S. Cl. ........................................ 148/233; 148/566

(58) Field of Classification Search .................. 148/233, 148/566

See application file for complete search history.

(56) References Cited

U.S. PATENT DOCUMENTS

| | | | |
|---|---|---|---|
| 2,426,773 A * | 9/1947 | Holden | 148/631 |
| 3,929,523 A * | 12/1975 | Kinoshi et al. | 148/526 |
| 4,741,785 A | 5/1988 | Welschof | |
| 5,527,402 A * | 6/1996 | Ganesh et al. | 148/675 |
| 5,527,502 A * | 6/1996 | Kiuchi et al. | 264/250 |
| 6,126,897 A | 10/2000 | Aihara et al. | |

FOREIGN PATENT DOCUMENTS

| | | |
|---|---|---|
| JP | 09079337 A | 3/1997 |
| JP | 11-199937 * | 7/1999 |
| WO | WO 03/025233 A1 | 3/2003 |

OTHER PUBLICATIONS

ASM International, Materials Park, Ohio, Properties and Selection: Irons, Steels, and High Performance Alloys: "Notch Toughness of Steels", Mar. 1990, vol. 1, pp. 737-742.*
ASM International, Materials Park, Ohio, Properties and Selection: Irons, Steels and High-Performance Alloys, "Classification and Designation of Carbon and Low-Alloy Steels", vol. 1, pp. 147-148, Mar. 1990.*
ASM International, Materials Park, Ohio, Heat Treating: "Introduction to Surface Hardening of Steels", vol. 4, Aug. 1991, pp. 259-267.*
English Translation of JP 09079337A.

* cited by examiner

*Primary Examiner* — Roy King
*Assistant Examiner* — Jessee R. Roe
(74) *Attorney, Agent, or Firm* — Rader, Fishman & Grauer, PLLC

(57) ABSTRACT

An articulated structural part includes a peripheral zone. The peripheral zone includes a surface, an outermost layer situated immediately adjacent the surface, a further layer situated adjacent the outermost layer and a core situated adjacent the further layer, wherein the outermost layer is substantially martensite. The further layer includes a varying mixture of martensite and of ferrite or perlite. The core is substantially ferrite or perlite. A process for producing an articulated structural part is also provided.

24 Claims, 1 Drawing Sheet

PROCESS FOR THE PRODUCTION OF AN ARTICULATED STRUCTURAL PART HAVING IMPROVED WEAR RESISTANCE

CROSS REFERENCE TO RELATED APPLICATION

This application is a continuation of and claims the benefit of PCT Application No. EP2004/010294 filed on Sep. 15, 2004 entitled "Process For The Production Of Articulated Structural Parts Of Improved Wear Resistance."

TECHNICAL FILED

The present invention relates to an articulated structural part and a process for the production of the articulated structural part having improved wear resistance.

BACKGROUND OF THE INVENTION

Articulated structural parts, for example those for constant velocity joints, are usually produced by drop forge technology, but may also by produced by machining tubes, rods and the like. These articulated structural parts are particularly exposed to stresses on the bearing surfaces, such as between connected outer joint parts and inner joint parts. Cracks often appear during operation of these parts because of the surface stresses, which may expose the articulated structural parts to a correspondingly faster wear.

Articulated structural parts, e.g., constant velocity joints having a joint cage, an outer joint part and an inner joint part, are usually produced from inductively hardenable structural steel having a carbon content in the range of about 0.45% by weight to about 0.55% by weight calculated on the total weight of steel. These types of structural steels, such as standardized carbon structural steel, e.g., CF53, containing about 0.5% by weight of carbon calculated on the total weight of steel, are typically used for the production of articulated structural parts. Accordingly, shaped objects produced for standardized carbon structural steel may be subsequently hardened e.g. by induction hardening, whereby, as a result of the induction hardening, a relatively fine-grained wear-resistant surface is obtained. A disadvantage of this method, however, is the low hardness of the structural parts, and also, in particular, the low resistance to crack propagation.

Accordingly, it would be advantageous to provide an articulated structural part having improved hardness. Moreover, it would be advantageous to provide an articulated structural part having crack propagation resistance.

SUMMARY OF THE INVENTION

An articulated structural part is provided and a process for the production of articulated structural part with improved wear resistance, and which, in particular, has greater resistance to crack propagation from surface stress.

The articulated structural part includes a bearing surface having three material regions, or two layers below the bearing surface.

The process for the production of the articulated structural part includes producing a part from steel having a carbon content in the range of about 0.4% by weight to about 0.6% by weight; carburizing the part to have a carbon content of up to 1.3% by weight laminarly up to a depth of 0.5 mm; and hardening the carburized part to a depth beyond the carburized depth.

The present invention has advantages by providing an articulated structural part and process of making an articulated structural part having improved wear resistance. The present invention itself, together with further objects and intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
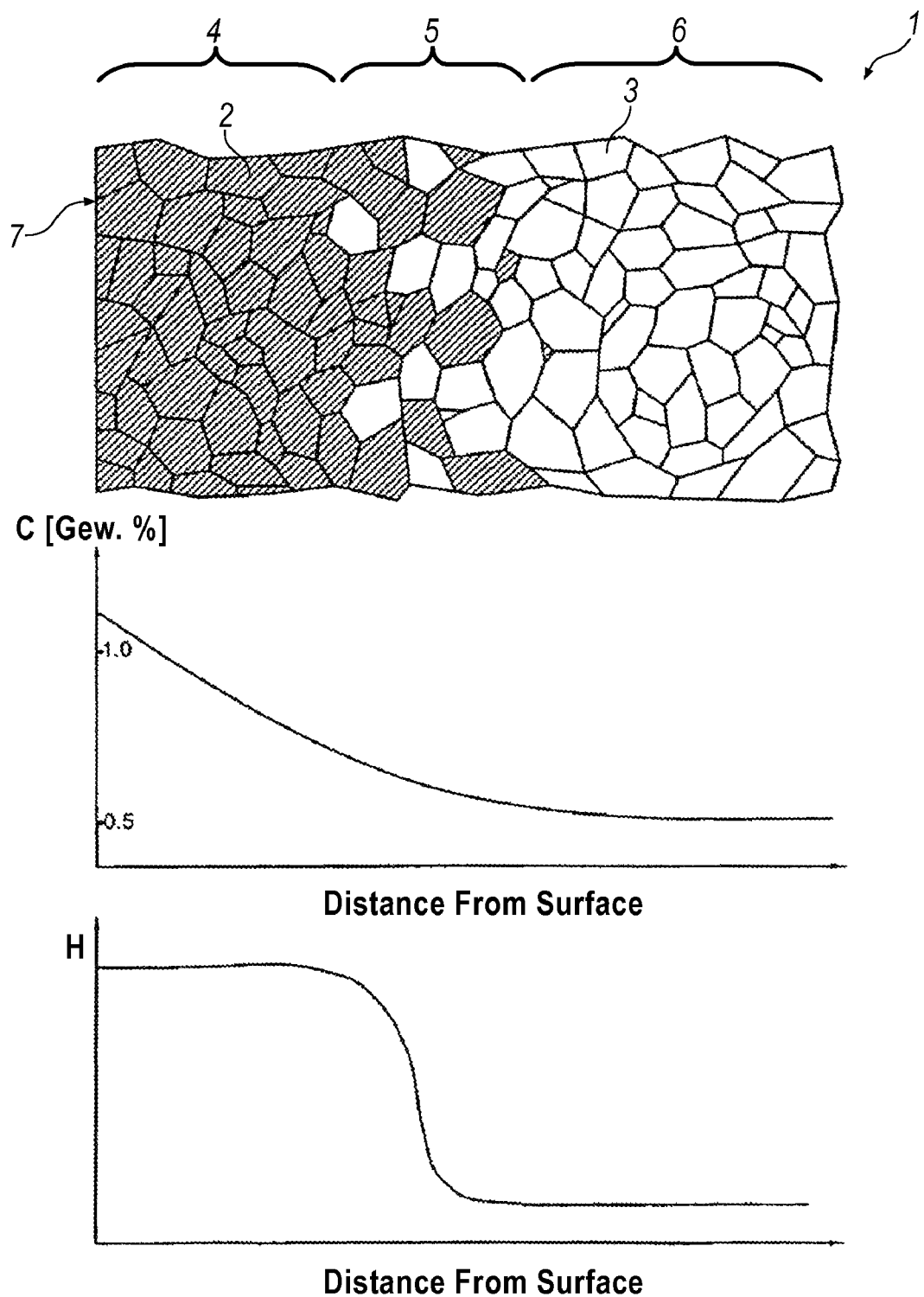
FIG. 1 shows a schematic view of a material structure near a surface of an articulated structural part produced by the process according to the present invention, including trend graphs of carbon content and hardness in the structure.

In the following description, various process parameters and components are described for one or more constructed embodiments. These specific parameters and components are included as examples and are not meant to be limiting.

The first embodiment of the invention provides a process of producing an articulated structural part by the following steps. In a first step, an articulated structural part produced from steel having a carbon content in the range of about 0.4% by weight to about 0.6% by weight calculated on the total weight of the steel is carburized in a manner that is at least partly laminar, up to a maximum depth of 0.5 mm measured from the surface of the structural part and to a carbon content of up to 1.3% by weight calculated on the total weight of the steel. In a second step, the carburized articulated structural part is hardened up to a depth that is greater than that obtained in the first step by carburizing, which can be up to a depth of about 2 mm, the depth being measured from the surface of the structural part.

Articulated structural parts within the context of the present invention may include, for example, without limitation, a joint cage, outer joint parts and inner joint parts for constant velocity joint applications.

The hardening in the second step is carried out inductively. Optionally, furnace hardening or flame hardening would also be acceptable. The process according to the invention provides articulated structural parts having increased wear resistance and improved resistance to crack propagation. The surface regions of the structural parts produced by the process of the invention are harder than that of the usual CF53 steel, for instance. The core of the articulated structural parts is both ductile and capable of load bearing. The indicated carbon contents of the carburized part may be up to 1.3% by weight. The carbon content of the carburized part has improved properties at a range of about 0.7% by weight to about 1.2% by weight, with even better properties at a range of about 0.8% by weight to about 1.1% by weight. The material contains, in addition to martensite, residual austenite, whereby the structural part produced in this manner may show self-complementing properties. "Self-complementing" within the context of the present invention means that the residual austenite present in the hardened surface layer is rearranged into martensite when undergoing deformation or reshaping. As a result, the strength and abrasion values of the structural parts produced according to the invention remain constant over a long period of time.

Carburizing in the first step can be carried out by gas carburizing or salt bath carburizing. Further, carburizing may take place in the form of carburizing or carbonitriding. The gas carburizing is accomplished, for example, in a $CO/CH_4$ atmosphere, and may optionally include the admixture of $H_2$ and/or $N_2$.

Carburizing can be carried out up to a depth of at least 0.1 mm beyond the maximum of Hertz's pressing of the structural part, measured from the surface of the structural part. Carburizing to a depth in the improved range of approximately 0.15 mm to 0.35 mm, with even better range of approximately 0.2 mm to about 0.3 mm. The carburizing may be done in a fully laminar manner, i.e., the surface of the entire shaped object is carburized. The process according to the invention provides a two-layered structure of the surface layer of articulated structural parts, where the layer next to the surface is present as martensite with portions of residual austenite, and the surface layer adjacent thereto has a martensitic structure but without residual austenite up to a depth of about 2 mm, with improved depth of about 0.8 mm to about 1.5 mm. Adjacent thereto is the unhardened and loadable core of the hardened articulated structural part. Advantageously, the service life of articulated structural parts produced in this manner is considerably prolonged.

In the layer next to the surface, residual austenite is present in an amount ranging from about 5% by weight to about 35% by weight, with improved range of about 20% by weight to about 32% by weight. The percent by weight is calculated on the total weight of the steel used. Since residual austenite is ductile and very hard, any cracks formed remain stuck at the surface of the structural part, and the cracks do not propagate through the material. As a result, damage to a structural part produced according to the invention occurs only at a considerably higher number of load reversals.

In the first embodiment, structural steel material used in the first step of the process according to the invention is essentially free from tin, arsenic and/or antimony. In particular, the absence of antimony or presence of antimony in the lowest possible amount is advantageous for carburizing in the first step of the process according to the invention, because antimony considerably increases the duration of carburizing and, as a result, under certain circumstances, the process according to the invention could become less economically acceptable.

Carburizing in the first step of the process according to the invention can be done at a temperature in the range of about 800° C. to about 1000° C., with even better range between 850° C. and 950° C. The duration of carburizing can be between about two to six hours, with even better duration of about three to about four hours. After carburizing, the carburized shaped object is cooled to a temperature of approximately 250° C., in a furnace atmosphere, at an appropriate rate such that martensitic rearrangement does not take place, or is at least minimized.

Hardening by induction in the second step can be carried out at a frequency in the range of about 5 kHz to about 45 kHz, a power in the range of 100 kW to 300 kW, with even better power range of 150 kW to 250 kW, and over a heating period in the range of about 1 to 15 seconds, with even better period of about 2 to 10 seconds. Subsequently, the induction-hardened shaped object is quenched in a polymer solution whose temperature can be in the range of about 20° C. to about 40° C. With induction hardening carried out with such parameters, a second, somewhat softer martensitic jointed structure situated below the external surface layer is obtained which advantageously serves as a support for the surface layer.

In an alternative embodiment of the process according to the invention, the second step may be divided into two partial steps for the induction hardening at different temperatures. The temperature in the first partial step can be at least 750° C., and the temperature in the subsequent second partial step being at most 300° C. (annealing). Here, the temperature chosen for the first partial step is above the rearrangement temperature of the core material of the carburized structural part obtained in the first step, so that here a rearrangement into martensite is obtained that is as complete as possible. In the second partial step, tempering (annealing) of the structural part takes place.

The present embodiment of the invention further relates to an articulated structural part produced by the process according to the invention. The shaped part having a hardened surface, obtained by the process according to the invention, can be further processed, e.g. by grinding or hard milling, without limitation.

FIG. 1 provides a second embodiment of the invention. FIG. 1 shows a schematic view of a material structure near a surface of an articulated structural part produced by the process according to the present invention, including trend graphs of carbon content and hardness in the structure.

The upper part of FIG. 1 shows a partial section, denoted by reference number 1, of a peripheral zone of an articulated structural part, for example the inner part of a constant velocity joint. This zone has a structure containing martensite 2, optionally with traces of residual austenite and ferrite or perlite 3. An outermost layer 4 situated immediately adjacent to a surface 7 of the structural part the structure substantially comprises martensite 2. Optionally, the outermost layer 4 may include trace portions of residual austenite. Adjacent to the outermost layer 4 is a further layer 5, which includes a mixture of martensite 2 and of ferrite or perlite 3. Adjacent to the further layer 5 is a softer core 6, which substantially comprises ferrite or perlite 3.

Presented in the middle part of FIG. 1 is a graph showing the trend of the carbon content C [Gew. %] by weight % of the indicated section of the articulated structural part, starting at the surface of the peripheral zone. It can be seen clearly that the carbon content steadily decreases from a value of 1.1% by weight in the immediate vicinity of the surface 7 of the articulated structural part, through the outermost layer 4 and the adjacent layer 5, toward the core 6, after which carbon content remains nearly constant in the core 6.

The graph in the lower part of FIG. 1 shows the variation of hardness H, which may be indicated either as Rockwell hardness or Vickers hardness. The trend of hardness may be designated as somewhat sigmoidal: starting at the surface 7 and proceeding in the direction of the core 6, it is noted that the hardness does not decrease in the outermost layer 4 but remains approximately constant. In the region of the intermediate layer 5, the hardness decreases relatively rapidly, and in region of the core 6 of the produced shaped object, it again assumes constant values.

A third embodiment of the invention is given by way of an example.

In a first step, a hot-forged inner part of a constant velocity joint made of structural steel CF53 having a carbon content of about 0.5% by weight is carburized to obtain a carbon content in the outermost layer 4 up to a depth of about 0.25 mm. The carburizing is carried out in a $CO/CH_4$ atmosphere at a temperature of about 930° C. over a period of 3 to 4 hours. The surface layer 4 then has a carbon content of about 1.1% by weight.

In a second step, the carburized shaped object is inductively hardened at a frequency of 8 kHz and with 260 kW power over a heating period of about 2.5 to 3 sec and at a coupling distance of about 1.5 mm between the structural part and the inductor. Thereafter, the structural part inductively hardened in this way is quenched at a temperature of about 28° C. over about 5 to 6 seconds in an approximately 12% polymer solution, such as Aquatensid LBF marketed by Petrofer Chemie HR Fischer GmbH & Co. KG, Hildesheim, Germany. Thereafter, the structural part is annealed for an additional 1.5 hours to a temperature of about 185° C. The shaped object inductively hardened in this manner now additionally shows an intermediate layer 5 to a depth of about 0.9 mm measured from the surface 7 of the inner part of the constant velocity joint.

The inner part of the constant velocity joint produced in this manner includes, in addition, portions of residual austenite in the outermost layer 4, as a result of which the inner part of the constant velocity joint produced according to the invention shows self-complementing properties.

Thus, the present invention provides a process by which relatively inexpensive structural steels can be provided with high-strength surface properties, and whereby the articulated structural parts produced in this manner show improved wear characteristics and thereby an increased service life.

From the foregoing, it can be seen that there has been brought to the art a new and improved articulated structural part, including a process method for the same. While the invention has been described in connection with one or more embodiments, it should be understood that the invention is not limited to those embodiments. On the contrary, the invention covers all alternatives, modifications, and equivalents as may be included within the spirit and scope of the appended claims.

The invention claimed is:

1. A process for making an articulated structural part comprising:
   providing a part made from steel having carbon content by weight in the range of about 0.4% to about 0.6%;
   carburizing said part laminarly up to a carburized depth of 0.5 mm below a surface of said part and achieving a carburized part having increased carbon content by weight of up to 1.3% such that a surface layer of the carburized part contains martensite and residual austenite;
   cooling said part after carburizing to a temperature of about 250° C.; and
   after cooling said part, then hardening said carburized part to a hardened depth being greater than the carburized depth by induction hardening, wherein induction hardening is carried out at a frequency in the range of about 8 kHz to about 15 kHz, a power range of about 150 kW to about 300 kW, and a heating period in the range of about 1 to about 15 seconds.

2. The process according to claim 1, wherein the steel is essentially free from tin, arsenic or antimony prior to carburizing.

3. The process according to claim 1, wherein carburizing is carried out at a temperature in the range of about 800° C. to about 1000° C.

4. The process according to claim 1, wherein carburizing is carried out over a period of about 2 to 6 hours.

5. The process according to claim 1, wherein hardening is carried out in two partial steps, the temperature at a first partial step being at a first higher temperature at least 750° C. and a second partial step being an annealing step whereby a second lower temperature is not more than 300° C.

6. The process according to claim 1 further comprising quenching after hardening in a polymer solution having a temperature ranging between about 20° C. to about 40° C.

7. The process according to claim 1, wherein said carburizing depth ranges between about 0.15 mm to about 0.035 mm.

8. The process according to claim 1, wherein said carburizing depth ranges between about 0.2 mm to about 0.3 mm.

9. The process according to claim 1, wherein said carburized part has carbon content by weight ranging between about 0.7% to about 1.2%.

10. The process according to claim 1, wherein said carburized part has carbon content by weight ranging between about 0.8% to about 1.1%.

11. The process according to claim 1, wherein said hardened depth ranges between about 0.8 mm to about 1.5 mm.

12. The process according to claim 1, wherein the induction hardening is carried out at a frequency of 10 kHz to approximately 15 kHz.

13. A process for making an articulated structural part comprising:
   providing a part made from steel having carbon content by weight in the range of about 0.4% to about 0.6%;
   carburizing said part laminarly up to a carburized depth of 0.5 mm below a surface of said part and achieving a carburized part having increased carbon content by weight of up to 1.3% such that a surface layer of the carburized part contains martensite and residual austenite; and
   hardening said carburized part to a hardened depth being greater than the carburized depth, by induction hardening, wherein induction hardening is carried out at a frequency in the range of about 8 kHz to about 15 kHz, a power range of about 150 kW to about 300 kW, and a heating period in the range of about 1 to about 15 seconds, wherein hardening is carried out in first and second partial steps, with a quenching operation therebetween, wherein in the first partial step, the temperature is at least 750° C.; wherein the second partial step is an annealing operation, wherein the temperature during the second partial step is not more than 300° C., wherein a three layered structure is achieved, including the surface layer, a further layer and a core layer.

14. The process according to claim 13, wherein the steel is essentially free from tin, arsenic or antimony prior to carburizing.

15. The process according to claim 13, wherein carburizing is carried out at a temperature in the range of about 800° C. to about 1000° C.

16. The process according to claim 13, wherein carburizing is carried out over a period of about 2 to 6 hours.

17. The process according to claim 13, further comprising cooling said part after carburizing to a temperature of about 250° C.

18. The process according to claim 13 further comprising quenching after hardening in a polymer solution having a temperature ranging between about 20° C. to about 40° C.

19. The process according to claim 13, wherein said carburizing depth ranges between about 0.15 mm to about 0.035 mm.

20. The process according to claim 13, wherein said carburizing depth ranges between about 0.2 mm to about 0.3 mm.

21. The process according to claim 13, wherein said carburized part has carbon content by weight ranging between about 0.7% to about 1.2%.

22. The process according to claim 13, wherein said carburized part has carbon content by weight ranging between about 0.8% to about 1.1%.

23. The process according to claim 13, wherein said hardened depth ranges between about 0.8 mm to about 1.5 mm.

24. The process according to claim 13, wherein the induction hardening is carried out at a frequency of 10 kHz to approximately 15 kHz.

* * * * *